United States Patent [19]

Chino et al.

[11] 4,341,595

[45] Jul. 27, 1982

[54] ROTARY VANE TYPE EVAPORATOR

[75] Inventors: Koichi Chino, Hitachi; Hideo Yusa, Katsuta; Akira Oda, Hitachi; Hideichi Miura, Tokaimura; Susumu Horiuchi, Hitachi; Yoshiyuki Takamura, Kudamatsu, all of Japan

[73] Assignee: Hitachi, Ltd., Tokyo, Japan

[21] Appl. No.: 206,533

[22] Filed: Nov. 30, 1980

Related U.S. Application Data

[62] Division of Ser. No. 54,945, Jul. 5, 1979, Pat. No. 4,279,692.

[30] Foreign Application Priority Data

Jul. 5, 1978 [JP] Japan .................................. 53/80997

[51] Int. Cl.³ .............................................. B01D 1/22
[52] U.S. Cl. ................................ 159/6 W; 159/11 A
[58] Field of Search ................. 159/6 R, 6 WH, 6 W, 159/11 A

[56] References Cited

U.S. PATENT DOCUMENTS 3,180,399  4/1965  Belcher et al. ..................... 159/6 W
3,190,817  6/1965  Neugebauer et al. .............. 202/236
3,216,042  11/1965  Strittmatter ........................ 159/6 W

*Primary Examiner*—Norman Yudkoff
*Attorney, Agent, or Firm*—Thomas E. Beall, Jr.

[57] ABSTRACT

A rotary vane type evaporator has a cylindrical vessel and a rotor rotatable therein. The rotor has vane supports fixed to a rotor shaft and vanes each pivotally mounted at the radially inner end to a vane support and having a radially outer end connected with a shoe extending in the circumferential direction of the vessel. Each vane is provided with a balance weight acting to keep constant, irrespective of the wear of the shoe, the pressing force which urges the shoe against the vessel inner peripheral surface. The rotor vanes are disposed in a plurality of stages arranged in axial direction of the rotor. The rotor is so constructed as to uniformalize the wear of the vane shoes over all the stages, whereby the frequency of the interruption of the evaporator operation for the renewal of vanes is lowered to improve the rate of the operation of the evaporator.

8 Claims, 15 Drawing Figures

ROTARY VANE TYPE EVAPORATOR

This is a division of application Ser. No. 54,945, filed July 5, 1979, now U.S. Pat. No. 4,279,692, issued July 21, 1981.

BACKGROUND OF THE INVENTION

1. Field of the Invention

The present invention relates to a rotary vane type evaporator.

2. Description of the Prior Art

The rotary vane type evaporator has a cylindrical vessel having a heated inner peripheral surface and a rotor disposed in the cylindrical vessel and carrying at least one vane. In operation, the material to be treated in a liquid or viscous state, i.e., the substance to be evaporated and dried, is urged against and spread over the heated inner peripheral surface of the cylindrical vessel by means of the vane or vanes of the rotor, so that a heat exchange is made across the wall of the cylindrical vessel to promote the evaporation of the substance thereby to dry the same.

This kind of evaporator can advantageously be used for drying and solidifying a wide variety of substances, a typical example of which is the effluent from a boiling water reactor which contains sodium sulphate as its major component.

Hitherto, there has been proposed a rotary vane type evaporator in which, in order to urge a substance strongly against the inner peripheral surface of the vessel to improve the efficiency of the heat exchange between the substance and the heated wall of the cylindrical vessel and to enhance the scraping or sweeping action performed by the outer ends of vanes, each vane is pivotally connected at its inner end to a point on the rotor offset from the axis of rotation of the rotor so that the vane end is strongly urged against the inner surface of the cylindrical vessel by the centrifugal force which is generated as the rotor is rotated at a high speed. This type of evaporator is shown, for example, in Japanese Pat. No. 38-6074 (6074/1963), particularly in FIGS. 9–11. More specifically, in the embodiment shown in FIGS. 10 and 11 of this publication, each vane is provided with a weight for increasing the centrifugal force acting on the vane. The Japanese patent referred to above corresponds to U.S. Pat. No. 3,130,108 by Albert W. Eckstrom and James G. Moor.

The use of the weight, however, raises a new problem, although it is effective in enhancing the pressure at which the substance to be treated is urged against the inner peripheral surface of the cylindrical vessel. Namely, the rate of wear of the outer end of the vane is increased due to the increase of the pressure at which the outer end is urged against the inner peripheral surface of the cylindrical vessel, resulting in a more frequent renewal of the vane. The frequency of the interruption of operation of the evaporator is increased to disadvantageously lower the rate of operation of the evaporator.

SUMMARY OF THE INVENTION

It is, therefore, a major object of the invention to overcome the above-described problems of the prior art to provide a higher rate of operation of the evaporator.

To this end, according to one feature of the invention, the radially outer end of each vane is connected with a shoe which extends in the circumferential direction along the inner peripheral surface of the cylindrical vessel. Accordingly, the contact area over which the inner peripheral surface of the cylindrical surface is contacted by each vane is increased to correspondingly decrease the surface pressure (pressing force per unit area) acting on the vane end and, hence, the rate of wear (thickness wise dimension of wear per unit of time) of the vane.

The frequency of renewal of the vanes is considerably decreased by attaching the circumferentially extending shoe to each vane. However, since the force by which the vane shoe is urged against the inner peripheral surface of the cylindrical vessel is decreased in inverse proportion to the increase of the wear, it is necessary to renew the vane when the latter has been worn out in excess of a predetermined limit of wear. In order to further reduce the frequency of this renewal of the vanes, according to a preferred embodiment of the invention, each vane is provided with a balance weight which acts to maintain, irrespective of the wear of the shoe, a constant force by which the vane end is urged against the inner peripheral surface of the cylindrical vessel.

In the case where a rotary vane type evaporator has an axially elongated cylindrical vessel and a multistage rotor in which a plurality of vanes are arranged in a plurality of stages which are arranged in the axial direction, the coefficient of kinematic viscosity of the substance under evaporation treatment varies over a wide range as the treatment proceeds, i.e. in the axial direction of the rotor, as will be discussed in more detail later. As a result, the wear of vanes of a plurality of stages is varied and non-uniform in the axial direction of the rotor provided that the pressing force acting on the vanes of all stages are equal. Therefore, it is often experienced that, while the vanes in a certain stage have been worn to an extent requiring renewal, the vanes of the other stages have not been worn so much and are still usable. It is quite inconvenient that the operation of the evaporator has to be interrupted because of the wear of vanes in only one stage while the vanes of other stages are still effective. Needless to say, this also lowers the rate of operation of the evaporator.

Therefore, according to another feature of the invention, there is provided a rotary vane type evaporator having a rotor which is so constructed as to assure a substantially uniform wear of vane shoes over all stages of vanes.

Usually, the most rapid wear of vanes is observed in the stage which is positioned in a region where the substance to be treated is in the liquid stage. Therefore, according to another embodiment of the invention, the circumferential dimensions of the shoes of vanes in this stage are larger than those of the vanes in the other stages so as to reduce the pressing force per unit area thereby to reduce the rate of wear. Alternatively, according to still another embodiment of the invention, the positional relationship between the vanes and the associated balance weights is varied in the axial direction such that the shoes of vanes in the stage within the liquid region are subjected to the minimum pressing force.

These and other objects, features and advantages of the invention will become clear from the following description with reference to the accompanying drawings.

DESCRIPTION OF PREFERRED EMBODIMENTS

Figure 1:
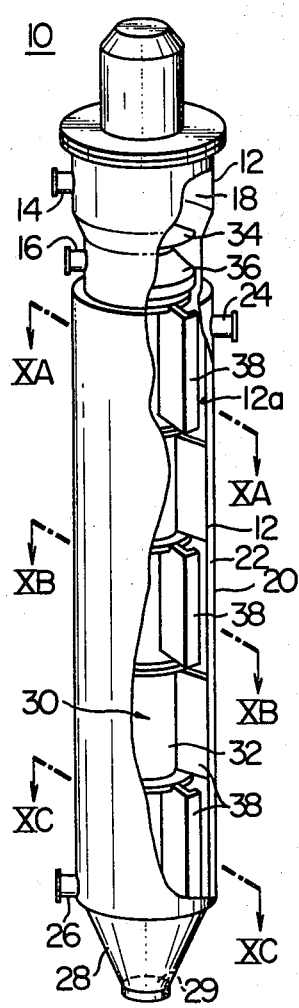
FIG. 1 is a perspective view of a rotary vane type evaporator in accordance with an embodiment of the invention, with a part thereof being removed to show the internal structure.

Referring to FIG. 1, a rotary vane type evaporator which is generally designated by a numeral 10 has a substantially cylindrical vessel 12, in the peripheral surface of the upper part of which are formed a vapor outlet 14 and an inlet 16 for the substance to be treated. The upper part of the vessel 12 defines therein a vapor chamber 18 which is communicated with the vapor outlet 14. The peripheral wall of the vessel 12 is generally cylindrical at its portion below the level of the liquid inlet 16. A cylindrical jacket 20 is disposed concentrically arround the cylindrical portion of the vessel 12 to cooperate therewith to define an annular chamber 22 therebetween. A heating medium is introduced into the annular chamber 22 through an inlet 24 to heat the peripheral wall of the vessel 12 and is returned to a source (not shown) of the heating medium through an outlet 26.

A rotor 30 is rotatably mounted in the vessel 12. The rotor 30 has a shaft 32 which extends substantially over the entire length of the vessel 12. The shaft 32 is journaled at its upper and lower ends by the vessel 12 by bearings (not shown). The rotor shaft 32 carries thereon a mist separator 34 positioned at the lower end of the vapor chamber 18 and also a frusto-conical distributor 36 which is axially aligned with the treated liquid inlet 16. In the illustrated embodiment, the rotor 30 is constructed as a multi-stage rotor and carries, at its portion below the distributor 36, a plurality of vanes 38 which are arranged in five stages disposed and arranged in the axial direction of the rotor 30. The vanes are secured to the rotor in a manner which will be described later.

To the lower end of the vessel 12 is attached a downwardly converging lower cone 28, in the lower end of which is formed a delivery port 29 for the substance which has been dried through evaporation. The substance delivered from the delivery port 29 usually takes the form of powder or granules.

Hereinafter, an explanation will be made regarding the process for evaporating and drying the effluent from a boiling water reactor by means of the evaporator of the illustrated embodiment. The effluent containing radioactive substances is introduced into the vessel 12 through the inlet 16 and is distributed by the distributor 36 uniformly in the circumferential direction of the vessel 12. The effluent thus distributed then flows down on the inner peripheral surface of the vessel 12 and is urged against the inner peripheral surface of the vessel 12 to take the form of a thin film of liquid, by the centrifugal force generated by the vanes 38 as a result of the rotation of the rotor 30.

The peripheral wall of the vessel 32 is heated by a heating medium, such as steam of 170° C., introduced into the annular chamber 22 through the heating medium inlet 24. Therefore, the treated liquid in the form of thin liquid film on the inner peripheral surface 12a of the vessel is heated and concentrated to cause eduction of the dissolved matters, such as sodium sulphate, so that a slurry is formed.

The evaporation and drying process proceeds as the substance to be treated flows downward in the vessel 12, and the substance which has been evaporated to a slurry is then formed into a solid which is then scraped off from the inner peripheral surface 12a of the vessel 12 and crushed into powder by the vanes 38 of the lowermost stage of vanes of the rotor 30. The powder is discharged through the powder delivery port 29.

Figure 2:
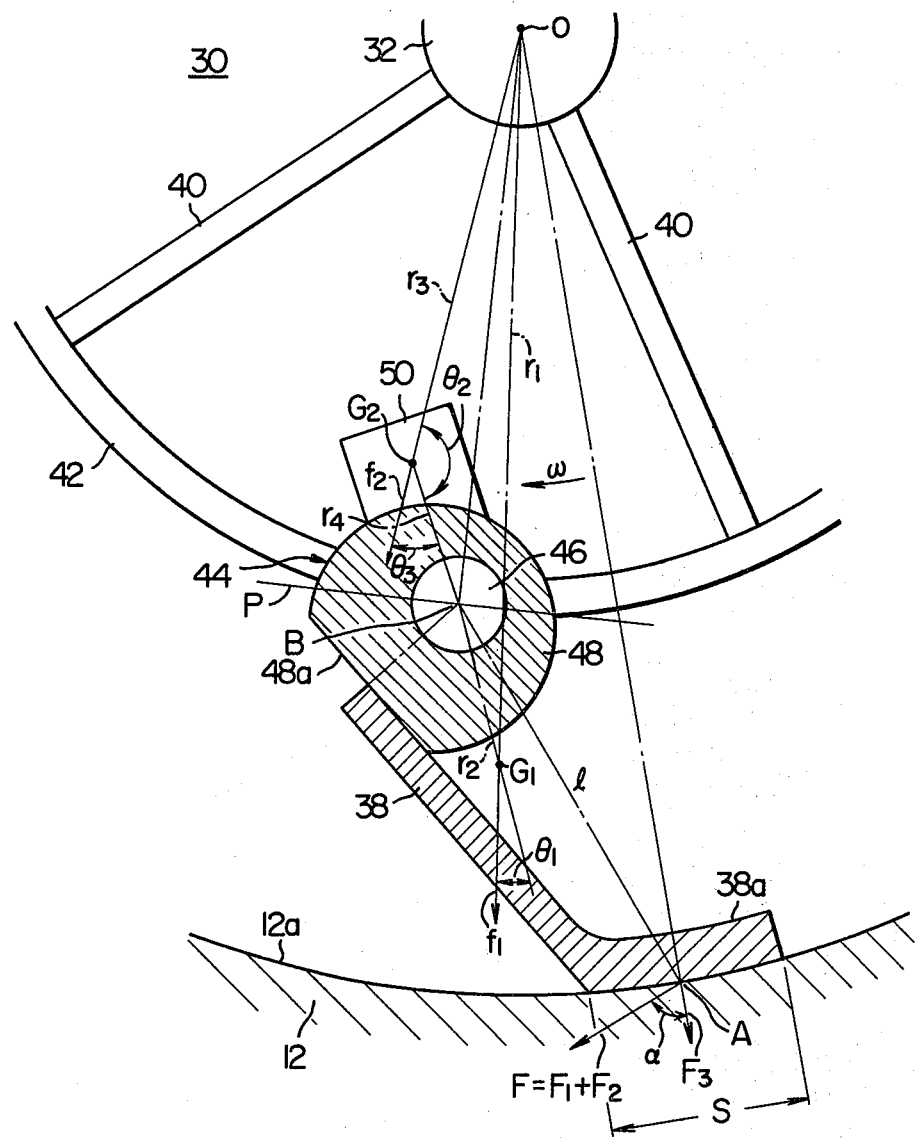
FIG. 2 is an enlarged cross-sectional view of a typical vane incorporated in the evaporator of the invention, illustrating the vectors of forces acting on the vane.

Each stage of vanes on the rotor 30 includes a plurality of circumferentially spaced vanes 38. In the drawings, however, only one vane is shown for each stage for the simplification of the drawings. As will be seen in FIG. 2, each vane 38 is pivotally mounted at its one end through vane mount means 44 to a vane support constituted by a ring 42 which is fixed to the shaft 32 by means of arms 40. More specifically, each mount 44 includes a pin 46 fixed to the ring 42 and a collar 48 rotatably fitted over the pin 46. A part of the peripheral surface of this collar 48 is flattened as at 48a. The vane 38 is fixed at its radially inner end to the flattened surface 48a by welding or the like measure. The major part of the vane 38 has a flat cross-sectional shape as shown in FIG. 2. A shoe 38a is integrally connected to the radially outer end of the vane 38 and extends in parallel with the inner peripheral surface 12a of the vessel 12.

As the rotor 30 revolves, the vanes 38 are rotated about the axis O of the shaft 32. As a result, a centrifugal force $f_1$ is exerted to each vane 38, so that the shoe 38a of the vane 38 is urged against the inner peripheral surface of the vessel. The force per unit axial length $F_1$ (hereinafter simply referred to as force) which urges the shoe 38a against the surface 12a is given by the following equation:

$$F_1 = \frac{W_1 r_1 r_2 \omega^2 \sin\theta_1}{l} \quad (1)$$

where, $W_1$ represents the weight per unit axial length of the vane 38, $\omega$ represents the angular velocity of the vane about the axis O, l represents the distance between the mid point A of the outer peripheral surface of the shoe 38a and the axis B of the pin 46 of the mount 44, i.e., the center of pivotal movement of the vane 38, $r_1$ represents the distance between the center $G_1$ of the centrifugal force acting on the vane 38 and the axis O, $r_2$ represents the distance between the axis B and the point $G_1$, and $\theta_1$ represents the angle formed between the line $BG_1$ and the line $OG_1$. The pressing force $F_1$ acts on the point A in the direction normal to the line AB.

On the other hand, the force $F_3$ which is exerted by the shoe 38a of vane 38 to the vessel surface 12a at the point A in the direction perpendicular to the inner peripheral surface 12a of the vessel 12, i.e. in the direction of the line OA, is given by the following equation:

$$F_3 = F_1 \cos\alpha \ldots \quad (2)$$

where, $\alpha$ represents the angle formed between the direction of the pressing force $F_1$ and an extension of the line OA.

Representing the circumferential length of the shoe 38a of the vane 38 by S, the surface pressure applied by the shoe 38a to the inner peripheral surface 12a of the vessel per unit axial length of the shoe 38 is given by $F_3/S$. Therefore, if the pressing force $F_1$ is maintained constant, the rate of wear (reduction of thickness due to wear) of the shoe 38a of vane 38 is decreased in inverse proportion to the circumferential length S of the shoe.

The overall weight $W_1$ of the vane as a whole is increased due to the provision of the shoe 38a at the radially outer end of the vane 38. In order to avoid the increase of the pressing force $F_1$ which would otherwise be caused due to the increase of the weight $W_1$, the radially inner end of the vane 38 is secured to the collar 48 of the mount 44 at a point which is positioned on the side of the line OB opposite to the shoe 38a, i.e. on the left side of the line OB as viewed in FIG. 2. By this arrangement, the surface pressure at which the shoe contacts the inner peripheral surface 12a of the vessel is decreased in spite of the increase of weight $W_1$ due to the provision of the shoe 38a. It has been confirmed that the rate of wear of the vane 38, which was otherwise as large as 40 mm/year, is decreased to 8 mm/year.

It is to be noted that the rate of the wear of the outer end of the shoe is considerably decreased to advantageously reduce the frequency of the renewal of the vanes thereby to provide an increased rate of operation of the evaporator 10. It will be appreciated that this advantage is provided simply by providing at the radially outer end of the vane a shoe which extends in the circumferential direction of the vessel 12.

Referring further to FIG. 2, a balance weight 50 is mounted on the outer peripheral surface of the collar 48 of the mount 44. As the rotor 30 revolves about its axis O, a centrifugal force $f_2$ is exerted to the balance weight 50. A force $F_2$ applied to the vane 38 due to this centrifugal force $f_2$ is given by the following equation:

$$F_2 = \frac{-W_2 r_3 r_4 \omega^2 \sin\theta_3}{l} \quad (3)$$

where, $W_2$ represents the weight per axial unit length of the balance weight 50, $r_3$ represents the distance between the center $G_2$ of the centrifugal force acting on the balance weight 50 and the axis O of the rotor shaft 32 of the rotor 30, $r_4$ represents the distance between the points B and $G_2$, and $\theta_3$ represents the acute angle formed between the line $OG_2$ and the line $BG_2$.

In the case where the vane 38 is provided with the balance weight 50, the force F by which the shoe 38a of the vane 38 is urged against the inner peripheral surface 12a of the vessel 12 is the sum of the force $F_1$ given by the equation (1) and the force $F_2$ given by the equation (3), i.e., a composite force $F_1 + F_2$. The force $F_1$ is reduced in inverse proportion to the increase of the wear of the shoe 38a. However, according to the present invention, the force $F_2$ is so varied as to compensate for the reduction of the force $F_1$ caused by the wear of the shoe 38a of the vane 38, so that the composite force F which is the sum of the forces $F_1$ and $F_2$ is maintained constant irrespective of the wear of the shoe 38a. This is graphically illustrated in FIG. 3. More specifically, FIG. 3 graphically shows the relationship between the forces $F_1$ and $F_2$ and the composite force F and the wear (mm) of the vane when the numerical values and factors in the embodiment shown in FIG. 2 are determined as follows:

l=69 mm, $r_1$=176 mm, $r_2$=40 mm, $r_3$=127 mm, $r_4$=26 mm, $W_1$=2.0 Kg/m, $W_2$=1.0 Kg/m, $\omega$=42 rad/sec., initial value of angle $\theta_1$=23° and initial value of angle $\theta_3$=13°.

Figure 3:
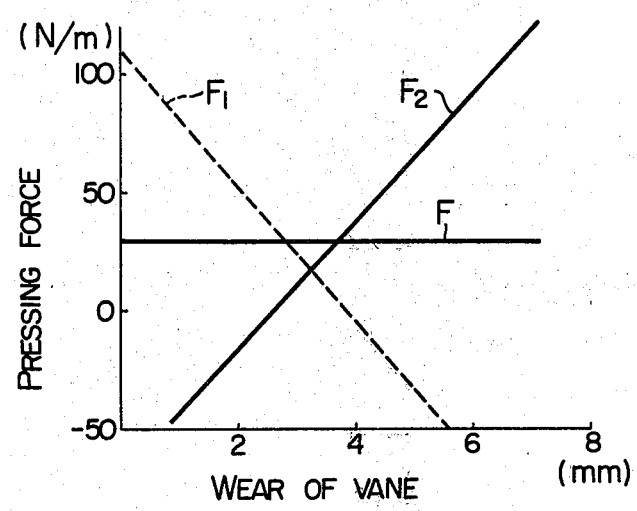
FIG. 3 is a diagram showing the relationship between the pressing force acting on the vane and the rate of wear of the shoe attached to the vane.

It will be understood from FIG. 3 that the forces $F_1$ and $F_2$ are gradually decreased and increased, respectively, as the wear of the vane 38 increases. The decrease and increase of the forces $F_1$ and $F_2$ are such that the composite force F is kept at a substantially constant value.

Figure 4:
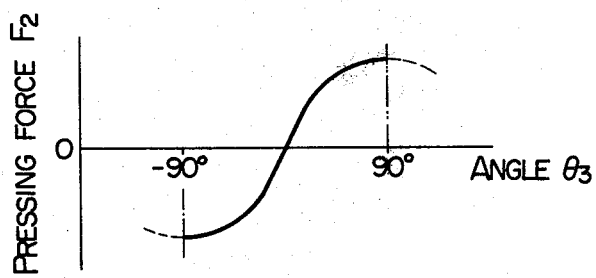
FIG. 4 is a diagram showing the relationship between an angle $\theta_3$ and a force $F_2$ shown in FIG. 2.

In order to maintain the composite force $F_1$ plus $F_2$ at a substantially constant level irrespective of the decrease of the force $F_1$ due to the increase of the wear of shoe 38a of the vane 38, it is an essential requisite that the force $F_2$ increases as the angle $\theta_3$ decreases. To meet this requisite, the angle $\theta_3$ has to fall within a range from $-90°$ to $+90°$, as shown in FIG. 4. In other words, it is essential to locate and fix the balance weight 50 with respect to the vane 38 such that the point $G_2$ is located on the side of a line P adjacent to the axis O of the rotor, the line P extending through the point B and being perpendicular to the line OB.

It has been confirmed that the life of the vane 38 provided with the balance weight 50 is as long as about 3.5 times of that of the vane having only the shoe 38a but no balance weight. The provision of the balancing weight offers another advantage. Namely, by incorporating the balancing weight, it becomes possible not only to adjust and set the pressing force F at a level which is suitable for preventing the scale of the treated substances from attaching to the inner peripheral surface 12a of the vessel 12 but also to maintain the force F at the set level for a long period of operation of the vanes.

Figure 5:
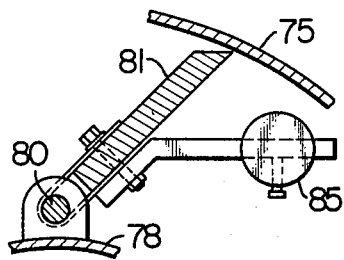
FIG. 5 shows a prior art vane provided with a weight.

FIG. 5 shows the positional relationship between the vane 81 and the weight 85 shown in FIG. 10 of the aforementioned Japanese Pat. No. 38-6074. In this prior art, the center of the centrifugal force acting on the weight 85 is positioned radially outwardly of a line which passes the center of the pivot axis 80 of the vane 81 and is perpendicular to a line which joins the pivot axis 80 and the axis of the rotor shaft 78. In this prior art, therefore, the pressing force F ($F_1 + F_2$) acting on the vane 81 against the vessel 75 is drastically decreased as the vane is worn out to require a frequent renewal of the vanes, resulting in a lowered rate of operation of the evaporator.

Figure 6:
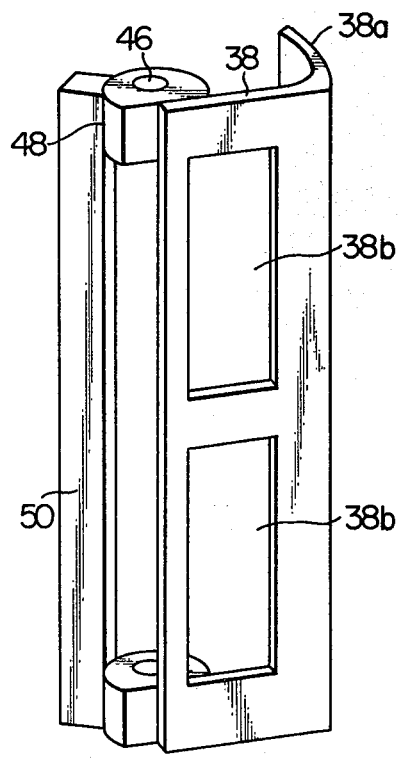
FIG. 6 is a perspective view of a typical vane used in the evaporator shown in FIG. 1.

FIG. 6 is a perspective view of a typical vane 38 which is used in the evaporator 10 shown in FIG. 1. As will be seen from this Figure, two openings 38b are formed in the flat web-like portion between the shoe 38a and the radially inner edge of the vane 38 so as to reduce the weight of the latter. The reduced weight of each vane 38 permits to reduce the diameters of the pin 46 and the collar 48 of the mount for pivotally mounting each vane on the ring 42. This in turn permits to increase the number of vanes 38 which can be mounted on a common ring 42, i.e., the number of vanes which can be installed in a single stage of vanes and, hence, to improve the performance of the evaporator.

It has been known that the thickness of a liquid film flowing on a vertical wall is in proportion to $\frac{1}{3}$ power of the coefficient of viscosity of the liquid as disclosed, for example, in Transports Phenomena, page 37. Therefore, the thickness of the liquid flowing on the inner peripheral surface of the vessel of a rotary vane type evaporator is gradually increased because the density of the liquid and, accordingly, the coefficient of viscosity are increased as the liquid flows down.

Figure 7:
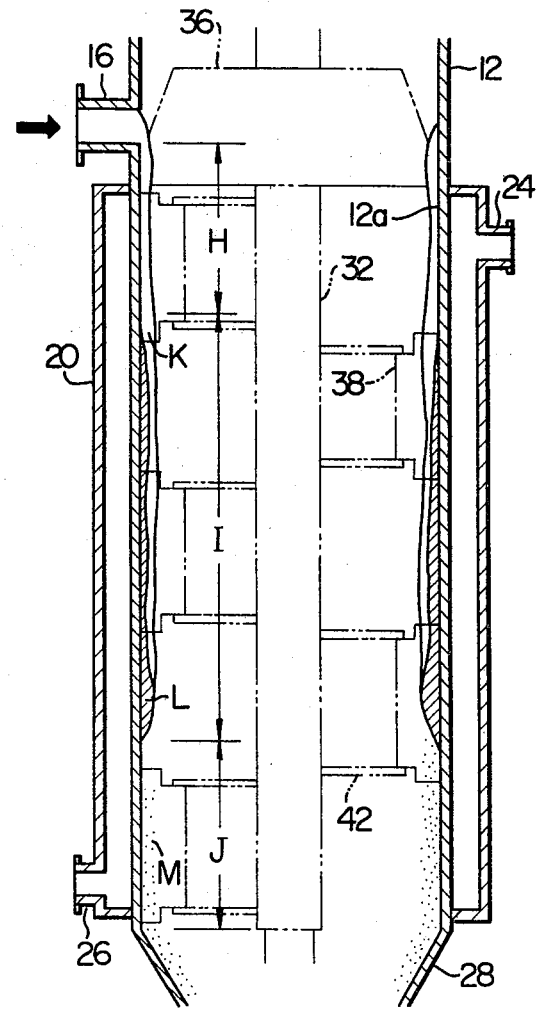
FIG. 7 is an axial sectional view of an evaporator, showing how the evaporation and drying process proceeds as the substance flows in the axial direction of the evaporator.

The process for evaporating and condensing the liquid in the rotary vane type evaporator 10 will be discussed in detail with reference to FIG. 7 (the selected liquid to be treated is an effluent from a boiling water reactor).

The liquid to be treated is introduced into the vessel 12 through the liquid inlet 16 and flows down on the inner peripheral surface 12a of the vessel. The liquid is heated up to the boiling point while the liquid flows down on the inner peripheral surface 12a of the vessel and, thereafter, the liquid is condensed due to evaporation. The liquid to be treated takes the form of an aqueous solution while the percentage of the sodium sulphate in the solution remains below the saturation point. This state of solution exists in a region H shown in FIG. 7. As the solution is condensed to the state of a supersaturation, a part of the sodium sulphate in the solution is educed to form a solid L, so that the solution is gradually formed into slurry which exists in an education region I. The coefficient of kinematic viscosity of the liquid to be treated, which has been as low as 1 centi-poise at the liquid inlet 16, is drastically increased to $10^4$ centi-poise when the liquid is formed into the slurry, as shown by a curve X in FIG. 8, so that the thickness of the liquid is correspondingly increased.

As the material to be treated is further condensed, the state of the material is changed from the liquid state to a state in which the educed solid, which is still wet, exists continuously. This region will be referred to as a drying region J. In this drying region J, the solid (sodium sulphate) which has been educed in the education region I is formed into powder which falls out of the vessel 12 by gravity.

It will therefore be noted that, in the solution region H, the substance to be treated exists all in the form of solution K, whereas, in the eduction region I, the solution K and the solid L coexist. In the drying region J, the material to be treated is in the form of the powder M.

Figure 8:
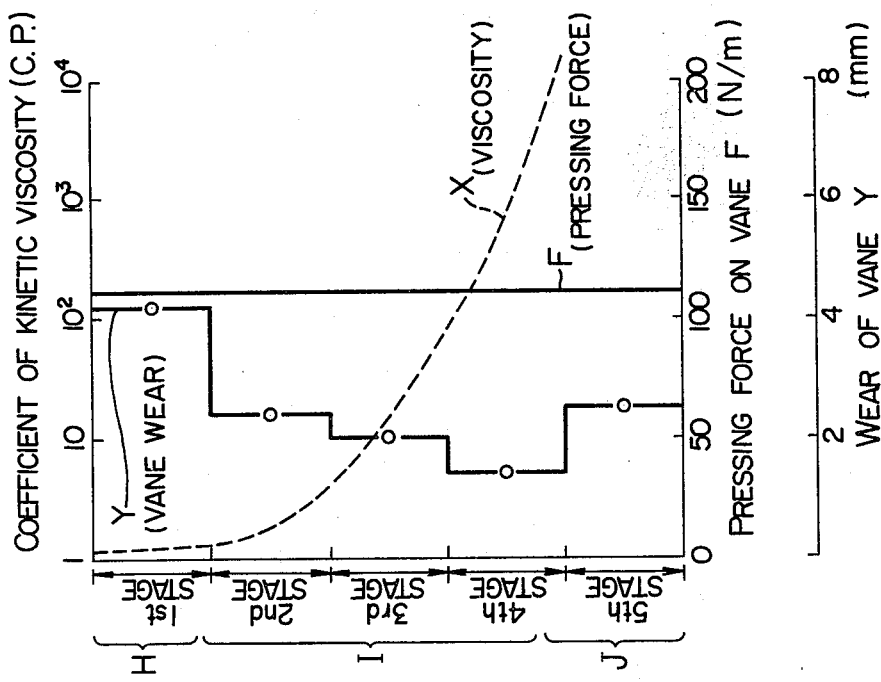
FIG. 8 is a diagram showing the relationship between the variation of the coefficient of kinetic viscosity of the substance in the axial direction of the evaporator and the variation of the rate of wear of vanes in the same direction in the case where the vanes of a plurality of stages are all subjected to the equal pressing forces.

In the case where the pressing forces acting on the vanes of all stages are equal, the rate of wear Y of the vanes is minimum in the fourth stage and is maximum in the first stage, as shown in FIG. 8. The variation in the vane wear rate will be discussed also with reference to FIG. 7. The minimum vane wear rate is observed in the eduction region I and the maximum wear takes place in the solution region H. The vane wear rate in the drying region J is smaller than that in the solution region H but is greater than that in the eduction region I.

The variation of the rate of the vane wear Y in the axial direction of the rotary shaft 32 is attributable to the fact that the coefficient of kinetic viscosity of the liquid to be treated is gradually increased as the treatment proceeds, so that the reaction force exerted by the liquid film to the vanes 38 is increased to lower the pressure at which the inner peripheral surface 12a of the vessel 12 is contacted by the vanes 38. Namely, the pressing forces F at which the vanes 38 are urged outwardly towards the inner surface 12a of the vessel 12 are equal in the axial direction of the rotor shaft 32, as shown by a line F in FIG. 8. The pressing force F at which each vane 38 is urged against the inner peripheral surface 12a of the vessel 12 is equal to the sum of the force exerted to the vessel inner surface 12a and the reaction force by the liquid film to the vane. The reaction force exerted by the liquid film to the vanes 38 in the eduction region I where the coefficient of kinematic viscosity is higher than that in the solution region H is greater than the reaction force exerted by the liquid film to the vanes in the region H. Accordingly, the force which the inner peripheral surface 12a of the vessel in the solution region H receives is greater than the force received by the vessel inner surface 12a in the eduction region I. Thus, the rate of the wear of the vanes 38 in the solution region H is greater than in the eduction region I.

Due to this variation of the rate of the wear of vanes in the axial direction of the rotor shaft, the vanes 38 in the solution region H are worn out to an inoperative extent while the vanes 38 in the eduction region I have not been worn so much and are still operative, with a result that the operation of the evaporator has to be interrupted solely for the renewal of the vanes 38 in the solution region H. This considerably lowers the rate of operation of the evaporator.

Figure 9:
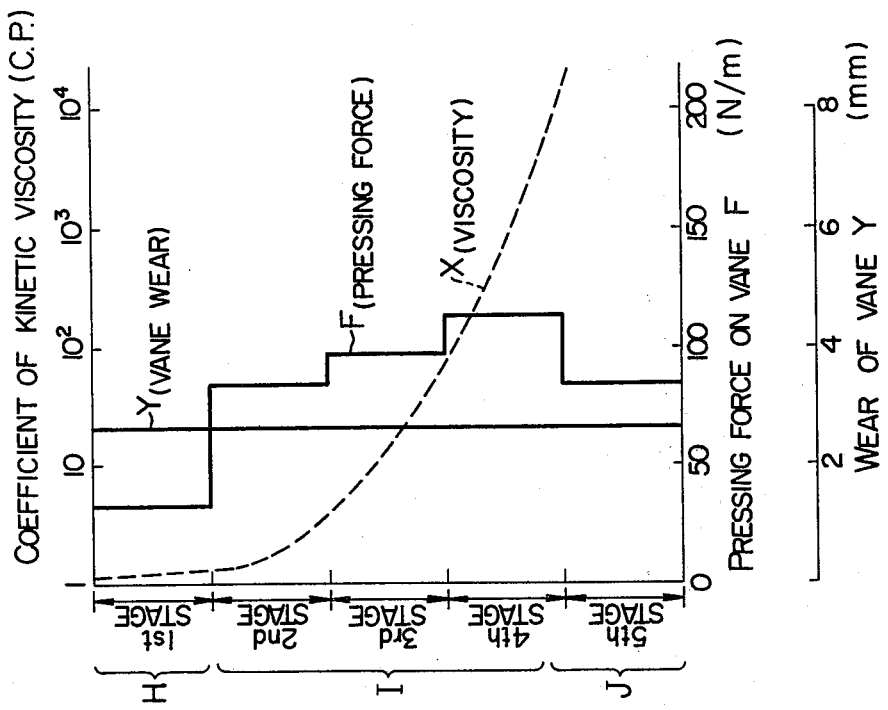
FIG. 9 is a diagram showing the relationship between the variation of the coefficient of kinetic viscosity of the substance in the axial direction of the evaporator and the variation of the rate of wear of vanes in the same direction in the case where the pressing forces applied to the vanes are varied in the axial direction of the evaporator.

In order to uniformalize the rate of wear Y of the vanes 38 in all regions in the vessel 12, i.e., in the solution region H, in the eduction region I and in the drying section J, the pressing forces F ($F_1 + F_2$) of the vanes 38 of all stages are advantageously varied in accordance with the characteristic curve F shown in FIG. 9.

Namely, according to the characteristic curve F in FIG. 9, the pressing force F of vanes 38 is smallest in the solution region H where the coefficient of kinematic viscosity of the substance to be treated in the vessel 12 is smallest, while the force F is greatest in the eduction region I where the coefficient of kinematic viscosity of the substance to be treated is greatest. In the evaporator 10 of the embodiment shown in FIG. 1, the rotor 30 is so constructed that the pressing forces F of the vanes 38 of the plurality of stages are varied in the axial direction of the rotor in accordance with the curve F shown in FIG. 9.

Figure 10A:
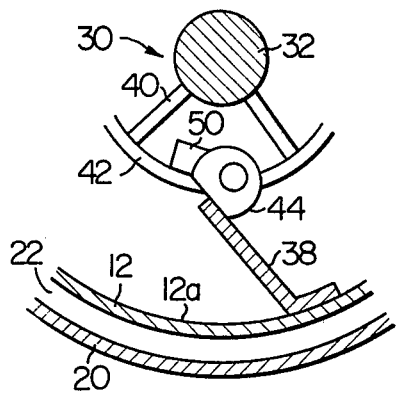
FIGS. 10A, 10B and 10C are fragmentary cross-sectional views taken along the lines XA—XA, XB—XB and XC—XC in FIG. 1, in which all vanes but one have been removed for the simplification of the drawings.
Figure 10B:
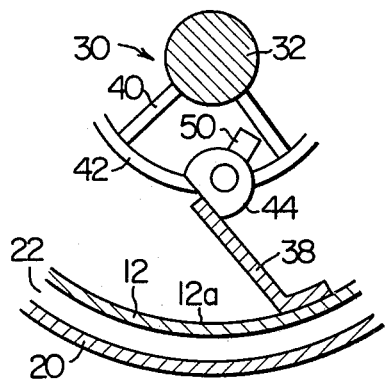
Figure 10C:
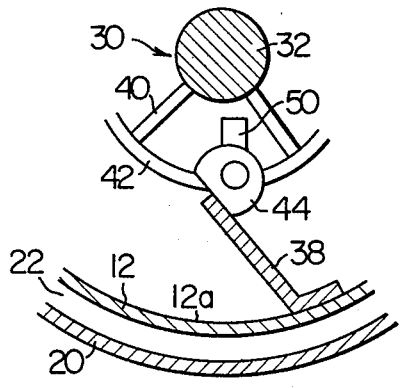

More specifically, as will be understood from the comparison of FIGS. 10A, 10B and 10C, the positions of the balance weights 50 relative to their associated vanes 38, namely, the values of the angle $\theta_3$, are different in the different regions H, I and J. As discussed previously, the pressing force F at which each vane 38 is urged against the inner peripheral surface 12a of the vessel 12 is varied with the variation in the angle $\theta_3$ provided that the other numerical values or factors are unchanged. Thus, the different positions of the balance weights 50 with respect to the vanes 38 in the different regions, as shown in FIGS. 10A to 10C, and thus, the different values of the angle $\theta_3$, produce different pressing forces F, as shown by the curve F in FIG. 9. As a result, the rates of the wears of the vanes of all stages are equalized in the axial direction of the rotor 30, as shown by the straight line Y in FIG. 9. The frequency of the interruption of the evaporator operation for the renewal of the vanes is therefore lowered with a resultant increase in the rate of operation of the evaporator. This is particularly advantageous in the case where the evaporator is used for treating the radioactive effluent from a nuclear reactor because the chance of irradiation of the operator is advantageously reduced thanks to the lowered frequency of vane renewal.

Figure 11A:
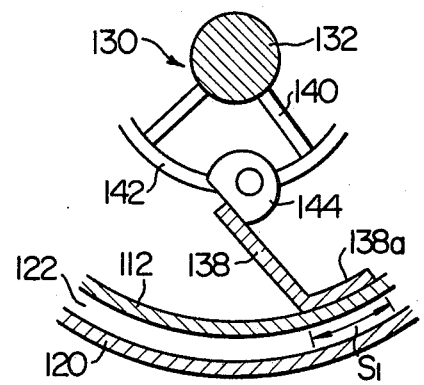
FIGS. 11A, 11B and 11C are views similar to FIGS. 10A, 10B and 10C but show vanes which are used in an evaporator of another embodiment of the invention.
Figure 11B:
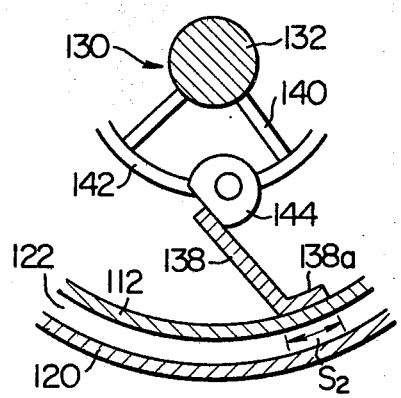
Figure 11C:
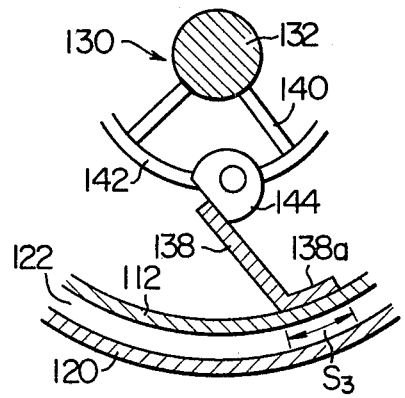

FIGS. 11A, 11B and 11C are views similar to FIGS. 10A to 10C, respectively, and show a second embodiment for substantially equalizing the rates of the vane wears in the axial direction of the rotor. The parts of the embodiment similar to those shown in FIGS. 10A to 10C are designated by similar reference numerals added by 100. The vanes 138 of the embodiment are not provided with balance weights and, instead, the dimensions of the shoes 138a of the vanes 138 in the circumferential direction of the vessel 112 are varied in the axial direction of the rotor 130. More specifically, the shoe 138a of the vane 138 in the solution region H of the evaporator has the largest circumferential length $S_1$, the shoe of the vane in the eduction region I has the smallest circumferential length $S_2$ and the shoe of the vane in the drying region J has a circumferential length $S_3$ which is larger than the length $S_2$ but smaller than the length $S_1$. By varying the circumferential lengths of the shoes 138a of vanes 138 in the axial direction of the rotor 130 as explained above, the pressures at which the shoes of the vanes contact the inner peripheral surface 112a of the vessel 112 are varied in the axial direction of the rotor 130.

What is claimed is:

1. A rotary vane type evaporator comprising:
    a vessel having a substantially cylindrical inner peripheral surface defining a substantially cylindrical space about a main axis and having inlet means at one axial end for passing a solution into said vessel at the one end to form a solution region and move axially therethrough to be treated by evaporation so that its viscosity changes in the axial direction to form a slurry region in the axially intermediate portion of said vessel and a powder region at the other axial end, and further having outlet means for removing the powder at the other end;
    means for heating at least a portion of said inner peripheral surface of said vessel for enhancing said evaporation;
    a rotor including a rotor shaft mounted in said vessel for rotation about said axis and a plurality of radially extending vanes mounted on said rotor shaft for rotation therewith adapted to force and spread said solution, slurry and powder over said vessel inner peripheral surface;
    said vanes being disposed in a plurality of stages arranged in the axial direction of said vessel, each region including at least one vane, each vane being pivotally mounted on said rotor shaft about a pivot axis parallel to and radially spaced from the axis of said rotor shaft, a shoe connected to the radially outer end of said vanes and each said shoe having a cylindrical surface slidingly engaging said vessel inner peripheral surface over an area extending along an arc in the circumferential direction of said vessel;
    said rotor including means to counteract the effect of axially changing viscosity and to urge said shoes against said vessel inner peripheral surface during rotation of said rotary shaft with radial acting centrifugal forces in said solution and powder regions that are substantially smaller than the radial forces within said slurry region so the shoes of the vanes of all the stages are worn at a substantially equal rate with use of an axially varying viscosity fluid, said means including a balance weight with a center of gravity being mounted on each said shoe for rotation therewith about the pivot axis and disposed to counteract the centrifugal force of the vane and shoe acting on said surface, the balance weight in a position of decreasing counterforce in the axial direction from the feed with the maximum centrifugal force being in an intermediate vane of the slurry region; and
    the position of said balance weight varying angularly about the pivot axis along the axial direction to thereby provide the positioning to change the centrifugal force provided by the balance weight from one region to another.

2. A rotary vane type evaporator as claimed in claim 1, wherein the mounting of said balance weight for each vane is such that the angle between a radial line from said main axis through said center of gravity and a line from said center of gravity through said pivot axis will have an angle within the range of greater than 0° to 180°, and said center of gravity being on the opposite side of a line perpendicular to a line through said axes than said shoe so that decreasing shoe centrifugal force caused by increasing shoe wear will be offset by increasing centrifugal force provided by rotation of said balance weight about said pivot axis caused by the shoe wear; wherein the balance weight provided for each vane is disposed in a fixed relationship to the vane and positioned such that the force which urges the shoe of the vane against the vessel inner peripheral surface is maintained constant irrespective of the wear of the shoe of the vane.

3. A rotary vane type evaporator as claimed in claim 2, wherein said shoes are identical, said vanes are identical, and said pivot axes are all equally spaced from said rotor shaft axis.

4. A rotary vane type evaporator as claimed in claim 3, wherein each of said balance weights is permanently and rigidly affixed to its respective vane and shoe.

5. A rotary vane type evaporator as claimed in claim 2, wherein each of said balance weights is permanently and rigidly affixed to its respective vane and shoe.

6. A rotary vane type evaporator as claimed in claim 1, wherein said shoes are identical, said vanes are identical, and said pivot axes are all equally spaced from said rotor shaft axis.

7. A rotary vane type evaporator as claimed in claim 6, wherein each of said balance weights is permanently and rigidly affixed to its respective vane and shoe.

8. A rotary vane type evaporator as claimed in claim 1, wherein each of said balance weights is permanently and rigidly affixed to its respective vane and shoe.

* * * * *